(12) United States Patent
Konnola et al.

(10) Patent No.: US 10,853,557 B2
(45) Date of Patent: *Dec. 1, 2020

(54) PROCESSING OF EDIT EVENTS IN A COLLABORATIVE DOCUMENT EDITING ENVIRONMENT

(71) Applicant: Documill Oy, Espoo (FI)

(72) Inventors: Mika Konnola, Espoo (FI); Rami Hanninen, Espoo (FI); Terho Laakso, Espoo (FI)

(73) Assignee: DOCUMILL OY, Espoo (FI)

(*) Notice: Subject to any disclaimer, the term of this patent is extended or adjusted under 35 U.S.C. 154(b) by 266 days.

This patent is subject to a terminal disclaimer.

(21) Appl. No.: 15/433,202

(22) Filed: Feb. 15, 2017

(65) Prior Publication Data

US 2018/0232346 A1 Aug. 16, 2018

(51) Int. Cl.
| | | |
|---|---|---|
| *G06F 40/166* | (2020.01) | |
| *G06Q 10/10* | (2012.01) | |
| *G06F 3/0482* | (2013.01) | |
| *G06F 3/0481* | (2013.01) | |
| *G06F 17/00* | (2019.01) | |

(52) U.S. Cl.
CPC ......... *G06F 40/166* (2020.01); *G06Q 10/101* (2013.01); *G06F 3/0481* (2013.01); *G06F 3/0482* (2013.01)

(58) Field of Classification Search
CPC .... G06F 17/24; G06F 17/241; G06F 17/2288; G06F 17/30011; G06F 40/166; G06F 3/0482; G06F 3/0481; G06F 17/2725; G06F 17/30489; G06Q 10/10; G06Q 10/101; H04L 65/403; H04L 63/08

See application file for complete search history.

(56) References Cited

U.S. PATENT DOCUMENTS

| | | | |
|---|---|---|---|
| 9,690,785 B1* | 6/2017 | Vagell | G06F 17/30011 |
| 2009/0199274 A1* | 8/2009 | Frazier | H04L 63/08 726/4 |
| 2016/0182412 A1* | 6/2016 | Kabbes | H04L 51/34 709/206 |
| 2018/0052587 A1* | 2/2018 | LaPier | G06F 3/0482 |
| 2018/0191805 A1* | 7/2018 | Hurwitz | H04L 67/06 |
| 2018/0203831 A1* | 7/2018 | Massand | G06F 17/24 |

\* cited by examiner

*Primary Examiner* — Quoc A Tran
(74) *Attorney, Agent, or Firm* — Nixon & Vanderhye (57) ABSTRACT

Disclosed is a solution for processing at least one edit event of a document in a collaborative document editing environment. The method includes: monitoring if a document is edited by at least one user in an editing function; in response to a detection that the document is edited generating at least one notification representing at least one edit event carried out to the document; receiving a response to the at least one notification, the response including an indication on a recipient action with respect to the prompt; and generating a signal carrying information representing the indication on the recipient action with respect to the prompt for causing at least one action with respect to the at least one edit event carried out to the document. Also disclosed is a system implementing the method and a processor-readable non-transitory medium storing processor-executable instructions for executing the method by a processor.

20 Claims, 4 Drawing Sheets

The user KK changed the field "Title" of the document "X" as follows:"Processing of edit events ~~Generation of notifications~~ in a collaborative document editing environment"

( Accept )   ( Discard )   ( Modify )
  510          520           530

FIGURE 1

| USER PROFILE NN | |
|---|---|
| User ID | xyz |
| Password | pwd123 |
| Contact detail(s) | N.N@email.com |
| | |
| Accessible documents | Document ID(s) |
| | |
| Document rights | Full edit/partial edit/view |

| Document XX | | |
|---|---|---|
| | | |
| Editor (user) | Time stamp | Edit description |
| NN | t1 | Field T edited as follows: asdf -> fdsa |
| KK | t2 | Field R edited as follows: qwerty |
| MM | t3 | Field R edited as follows: qwerty -> yuiop |
| NN | t4 | Field T edited as follows: fsda -> fsd |

FIGURE 4

The user KK changed the field "Title" of the document "X" as follows:"Processing of edit events Generation of notifications in a collaborative document editing environment"

Accept  510
Discard  520
Modify  530

PROCESSING OF EDIT EVENTS IN A COLLABORATIVE DOCUMENT EDITING ENVIRONMENT

TECHNICAL FIELD

The invention concerns in general the technical field of collaborative digital working environment. More particularly, the invention concerns processing of edit events carried out to a document in a collaborative document editing environment where a plurality of users may be involved in the document editing process.

BACKGROUND

Nowadays digital computing environments enable so called collaborative working environments in which a plurality of users are integrated over a communication network to cooperate around a common task. An example of such a situation is when an electronic document is arranged to be simultaneously accessible for a plurality of users and the users may perform pre-determined operations, even simultaneously in real-time, to the document. For example, users may modify content of the document together, e.g. write a book, and through the online collaboration arrangement increase efficiency in the creation of the document in question.

Traditionally, the collaborative document editing environment was implemented so that it enabled a single user to edit a document at the time. In practice this meant that users were allowed to edit the document serially (one user at any given time), each user taking his/her turn on making modifications to the document. This was called turn-based document editing. Users just had to be able to access the document (file), carry out the edits, and save the modified version back to the storage system. For the storage system, this required ability to lock a document file to be editable to just one user at a time. This locking capability was fundamental in file systems, shared network file drives and much later on, also in so called cloud-based file storage services which were initially designed to mimic the functionality of shared network file drives. Some of these systems offered other capabilities like versioning (version history) support, which turned out to be quite handy when enabling multiple users to edit a certain document, each user taking their turn, and versioning system capturing modifications made, allowing users to revert back to a certain previous version if needed.

Today, key aspect is that many document management systems, enterprise portals and cloud services enable users to upload their documents for storing purposes, as well as enable others to edit them as already mentioned above. Besides relying only on users to notify other users about the fact that a certain document has been modified or deleted, or about a new document made available for others to edit—these systems offer notification system which let other users to know about the actions a certain user did, either automatically, or based on users' voluntary action. As these systems often authenticate users accessing and editing document, they may use users' identity and enable other users to get (almost) instant notifications in case their action might be needed, or just in order to keep them informed what other user(s) just did.

This kind of automated notification system which tracks and communicates system's and users' actions to other users is one of the cornerstones of any cloud based document storage and sharing service. It enables people to be on the top of the content made available (and editable), and take action (edit a document) in case that is expected from them. These kind of notifications are delivered to the users in various ways; e-mails, integrated in-app messages embedded in various social media services, SMS messages and often also as core functionality embedded into some client/web-front end the users use to access a document-centric solution or an online service.

When bringing the above described aspects of prior art solutions into a practice, it is also necessary to describe a typical document editing process in a collaborative environment. Usually it goes as described in the following steps:

(i) Content creation, such as document editing, may start from desktop computer, using typical word processing applications available in the desktop environment. In this approach, a person (the initial editor) first creates a document using desktop word processing application, and then decides to make the document available for others to view and edit, e.g. shares it. In some cases, the initial document creation happens automatically by some document automation solution which generates the document by combining dynamic data content with pre-existing document template. Also, in some cases, the document creation happens entirely online, using some online editing solution instead of first creating the initial version of the document using desktop word processing application.

(ii) The initial editor or in some cases the document automation solution uploads the document file into cloud.

(iii) The initial editor may first edit the document using some online editing solution (either real-time co-edit, or turn-based).

(iv) After making sure (optionally) that the document, now stored in the cloud service, is ready to be shared with others, the initial editor shares the document by in-prompt defining to whom it should be shared, and with what kind of rights (view or comment only, perhaps edit too). It is also possible that the sharing happens based on initial creator's user profile, membership to certain user groups, organization or some other pre-defined detail which defines the sharing scope.

(v) Depending on the online service where the document file was uploaded and subsequently shared, possible collaborators (either defined by the person who uploaded the initial version of the document, or perhaps a pre-defined group of people based on initial creator's user profile, may get high-level notifications if somebody opens a document to view it, comments it or edits a document.

(vi) These notifications are (automatically) sent to the users "subscribing to that document", and are in a form of "user X did something to document Y and thereby you should be aware of it".

(vii) Quite typically the default mean to send the notifications is via e-mail; some applications also support sending such notification messages into $3^{rd}$ party service, within which they appear as messages from external application/service, targeted and visible to a certain predefined collaborator or a group of collaborators.

(viii) At some point of time now cloud-based document may be exported back to a format which allows editing and/or viewing on desktop. Once such export function is initiated, it concludes to file download into a local system.

The prior art solutions have drawbacks especially when it comes to notification mechanisms. Namely, even if a certain user is notified on the edit event, that user needs to take action based on such an edit event through initiating an applicable application, such as a document editor. This is time consuming task especially because the user needs to, after opening the edited document in the editor, find the edited section from the document, make necessary amendments if any to the document through the editor and store and close the document in question. This kind of manual intervention to the document is, as said, time consuming and consumes computing resources. Also, it limits the recipients' ability to take action in case recipients are working on limited power devices where initiating an applicable editing application is not practical, or is perhaps impossible due to device characteristics. Hence, there is need for improvement with respect to the prior art solutions.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present a computer-implemented method, a system and a processor-readable non-transitory medium for processing at least one edit event in a collaborative document editing environment. Another objective of the invention is that the computer-implemented method, the system and the processor-readable non-transitory medium enhances an interaction with respect to the at least one edit event by a user.

The objectives of the invention are reached by a computer-implemented method, a system and a processor-readable non-transitory medium for generating a notification in a collaborative document editing environment.

According to a first aspect, a computer-implemented method for processing at least one edit event of a document in a collaborative document editing environment is provided, the method comprising: monitoring if a document is edited by at least one user in an editing function; in response to a detection that the document is edited in the editing function generating at least one notification representing at least one edit event carried out to the document, the generated notification comprising information for providing at least one prompt for the recipient of the notification with respect to the edit event carried out to the document, and transmitting the at least one notification to a communication function; receiving, from the communication function, a response to the at least one notification transmitted to the recipient, the response comprising an indication on a recipient action with respect to the prompt; and generating a signal carrying information representing the indication on the recipient action with respect to the prompt for causing at least one action with respect to the at least one edit event carried out to the document.

The detection that the document is edited may be performed by monitoring edit events carried out to a detailed structural representation of data of the document.

The generation of the at least one notification may be performed in response to a fulfillment of a trigger event defined with respect to the at least one edit event. The trigger event may be based on filtering of the at least one edit event according to a predetermined filtering scheme. Alternatively or in addition, the trigger event may be based on a predetermined process flow. Still further, the trigger event may also be based on a predetermined time scheme.

The at least one prompt may be implemented to embed at least one action for the editing function in the communication function.

The at least one action taken with respect to the at least one edit event carried out to the document may be performed by the editing function to a detailed structural representation of data of the document.

According to a second aspect, a system for processing at least one edit event of a document in a collaborative document editing environment is provided, the system comprising: at least one processor; and at least one memory including computer program code; wherein the at least one memory and the computer program code configured to, with the at least one processor, cause the system at least to perform: monitor if a document is edited by at least one user in an editing function; generate, in response to a detection that the document is edited in the editing function, at least one notification representing at least one edit event carried out to the document, the generated notification comprising information for providing at least one prompt for the recipient of the notification with respect to the edit event carried out to the document, and transmitting the at least one notification to a communication function; receive, from the communication function, a response to the at least one notification transmitted to the recipient, the response comprising an indication on a recipient action with respect to the prompt; and generate a signal carrying information representing the indication on the recipient action with respect to the prompt for causing at least one action with respect to the at least one edit event carried out to the document.

The system may be configured to perform detection that the document is edited by monitoring edit events carried out to a detailed structural representation of data of the document.

The system may also be configured to perform the generation of the at least one notification in response to a fulfillment of a trigger event defined with respect to the at least one edit event. The system may be configured to base the trigger event on filtering of the at least one edit event according to a predetermined filtering scheme. Alternatively or in addition, the system may be configured to base the trigger event on a predetermined process flow. Further, the system may also be configured to base the trigger event on a predetermined time scheme.

The system may be configured to implement the at least one prompt to embed at least one action for the editing function in the communication function.

Moreover, the system may be configured to perform the at least one action taken with respect to the at least one edit event carried out to the document by the editing function to a detailed structural representation of data of the document.

According to a third aspect, a processor-readable non-transitory medium storing processor-executable instructions is provided for processing at least one edit event of a document in a collaborative document editing environment according to a method as defined above.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

FIG. 1 schematically illustrates a collaborative document editing environment in which the present invention may be implemented to.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1:
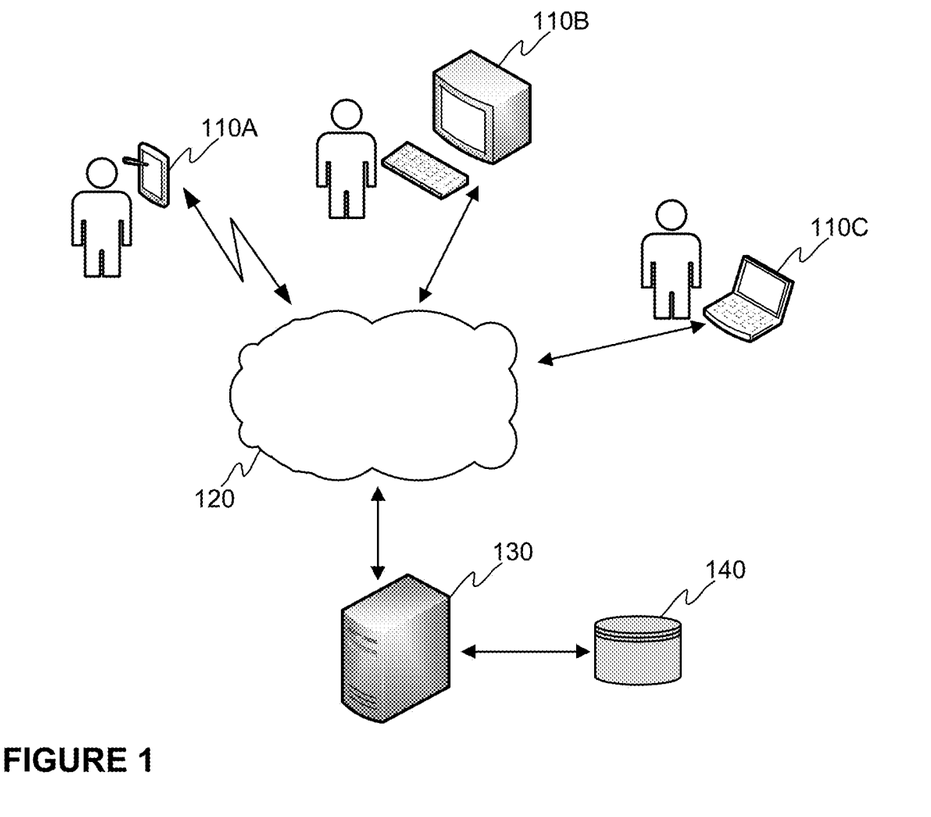

According to the present invention one aim is to enable implementing a collaborative document editing solution in such a way which will improve awareness of other users about the edits made to a content of a document by a certain user. FIG. 1 schematically illustrates a non-limiting example of a communication environment into which a collaborative document editing environment according to the present invention may be implemented. The implementation of the solution according to the present invention may be arranged by using one or many communication networks together forming the communication environment. As said the communication environment depicted in FIG. 1 is only an example and alternative environments may exist. The present invention is especially advantageous in an online collaborative document editing environment.

In the exemplary collaborative document editing environment of FIG. 1 a plurality of users may access to the communication environment, and thus to a collaborative document editing environment as will be discussed, with their terminal devices 110A, 110B, 110C. The terminal devices may e.g. be mobile terminals 110A, personal computers 110B or laptop computers 110C or any similar by means of which it is possible to access, and participate, to the collaborative document editing environment. The access to the collaborative document editing environment may be performed over a communication network 120, or over a plurality of communication networks implementing different network technologies. Moreover, the communication of the terminal devices 110A-110O may be implemented in a wired or wireless manner.

The collaborative document editing environment, as schematically depicted in FIG. 1, comprises at least one server 130 which is configured to execute a collaborative document editing environment at least in part. The server 130 may access to one or more databases 140, or data storages, which may be configured to store one or more documents available for collaborative use. In other words, the server 130 may be configured to obtain, e.g. in response to a received user instruction given with a terminal device 110A-110O, a document from a database 140 and establish a collaborative document editing environment by initiating an editing function in the server 130. The editing function refers to a specific process, e.g. implemented in a form of a computer application, which is executed in the server 130 into which one or more of the terminal devices 110A-110O may access for providing means in order to edit the document in question. The terminal device 110A-110C may also execute an editing function, which is configured to cooperate with the server 130 as will be described. A non-limiting example of the editing function executed in the terminal device 110A-110O is an Internet browser, wherein a JavaScript is executed for exchanging data with a service executed in the server 130.

In the following a non-limiting example of the editing function executed in the server 130 in question is described. It is assumed that the document stored and obtained from the database 140 for editing is in a form of some commonly used document formats, such as created with some known document creation programs. The editing function executed in the server 130 may be configured to obtain the document, and to read and parse the document and its content, and to generate an intermediate representation of the parsed data. Further, the editing function may be configured to determine document, cf. page and/or object layouts, and paginate the content. Finally, the editing function may be configured to generate a final output format which is provided for editing purposes in the server 130, and thereby made accessible to editor applications running on terminal devices 110A, 110B and 110C. The final editable output format may e.g. be a HTML presentation of the original document. The manipulation of the original document into the final output format for editing enables, among other things, utilization of modern HTML centric browser tools when the final output format for is HTML. When the original document is brought to HTML format through an intermediate format as described, no information belonging to the original document is lost even in cases when the HTML representation of the original document cannot properly display all the data originally included in the document. Furthermore, bringing the document into the HTML format for transmission purposes, and subsequently parsing that HTML format into Document Object Model (DOM) presentation, increases a granularity and modifiability of the document data, in comparison to the original document format which has been primarily designed for enabling compact storage and transmission of the document data. Ability to track changes happening with Document Object Model (DOM), coupled with Operational Transformation (OT) technology for maintaining content consistency in concurrent collaborative editing situations enable accurately syncing of changes carried out by the users simultaneously working with the document in question. Hence, it is possible to keep track on changes carried out to the document in a document data object level. Worthwhile to mention already at this stage is that it is possible to return the document back in the original storage and transmission format, i.e. from Document Object Model representation into HTML format, and then back to the original document storage and transmission format through the intermediate format.

Figure 2:
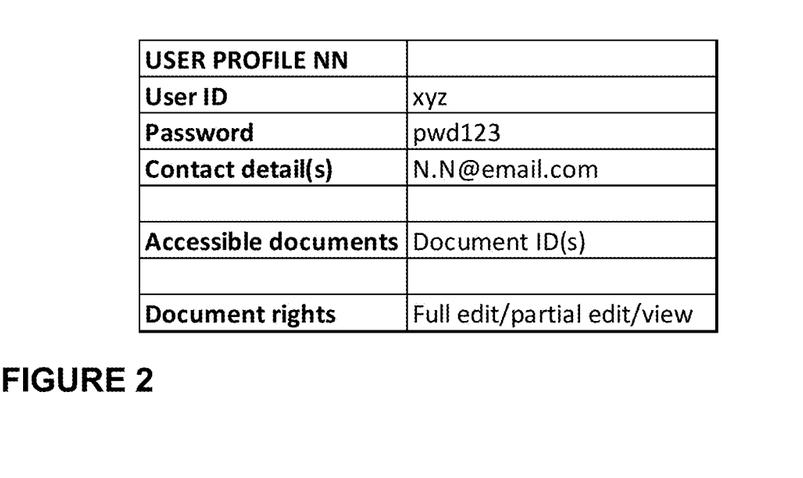
FIG. 2 schematically illustrates an example of user profile to be applied in the context of the present invention.

For describing the present invention further it is assumed that the original document is brought to the HTML format and, thus, when the HTML file is parsed into Document Object Model (DOM), the editing function provides access for the users to manipulate the document data stored into Document Object Model (DOM) using editor applications running on the terminal devices 110A-110C. Further, the server 130 may be configured to maintain user profiles of the users allowed to access the one or more documents being accessible through the server 130. FIG. 2 schematically illustrates an example of user profile for user NN, which may be maintained in the server 130, or in any network entity into which the server 130 may be configured to have an access. The exemplary user profile may comprise data records for user ID (xyz) and a password (pwd123) for the user ID. The user ID and the password are advantageously provided to the user NN prior to when he/she intends to access the server for editing a document in question. The user profile may also comprise a data record indicating one or more contact details, such as email address or similar, to the user. Further, according to one embodiment of the invention the user profile may comprise one or parameters by means of which the user rights may be defined on a user basis. For example, the user profile may comprise a parameter in a form of a data record indicating, or defining, documents into which the user in question has right to access. Moreover, another parameter may define rights for the user to edit the document(s) into which the user has access. For example, the user may be provided full edit rights, partial edit rights, such as commenting, or only right to view on the document and edits made to the document. The level of access rights may be defined in a plurality of ways. According to one embodiment, the access rights may be defined on a user based, e.g. user in question may edit all the documents into which he/she has access in the manner as defined in the document right parameter. According to some other embodiment the user profile may also store information on user groups the user in question belongs to. Naturally, it is possible to set a default value for access right if seen necessary.

According to another advantageous embodiment of the present invention it is possible to define the document rights on a document based manner i.e. for each document it is separately defined right or rights which may define, at least, the users who may access the document. Additionally, the document right may comprise information which defines the access rights for each user with respect to a certain document. As mentioned the access right may define that the user may edit the document, comment it or only view the document. This kind of document access information may be associated to a document with e.g. a separate data record or included in the document, e.g. by storing it in a metadata of the document in question, which may be accessed for defining access right of a certain user. In this kind of implementation the user profile(s) are relevant for accessing the service in general and for storing e.g. contact details for the user(s).

Figure 3:
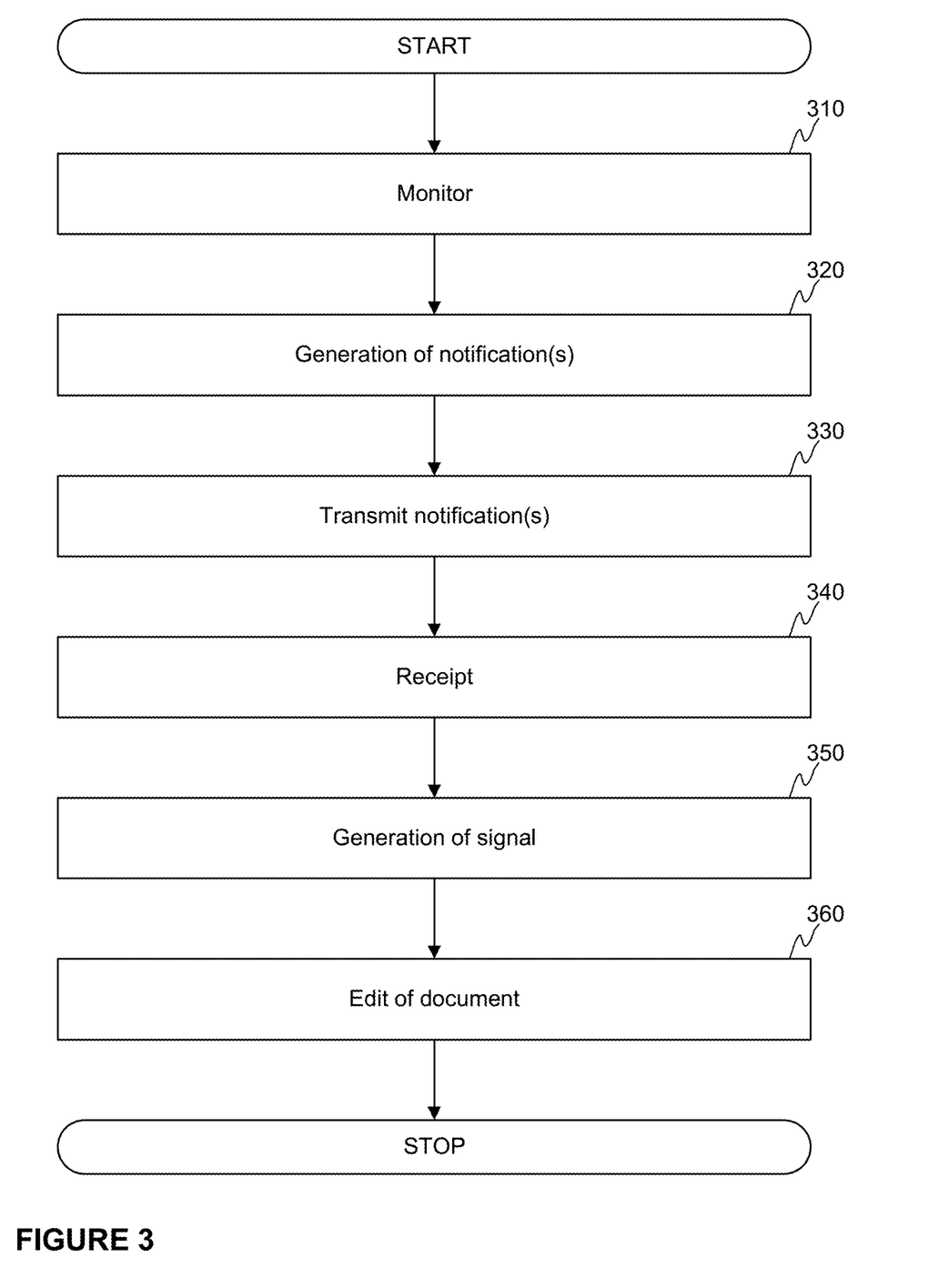
FIG. 3 schematically illustrates a computer-implemented method for processing one or more edit events carried out to a document accessible in a collaborative document editing environment according to an embodiment of the present invention.

Next at least some aspects relating to the present invention according to an embodiment is described by referring to FIG. 3. FIG. 3 schematically illustrates a computer-implemented method for processing one or more edit events carried out to a document accessible in a collaborative document editing environment according to an embodiment of the present invention. The processing of the edit events according to the present invention may be performed in a edit event processing function, which is configured to operate at least in part between the editing function, which provides at least some tools for users to edit the document in question, and the communication function, which provides a communication tool for communicating with at least one user.

Figure 4:
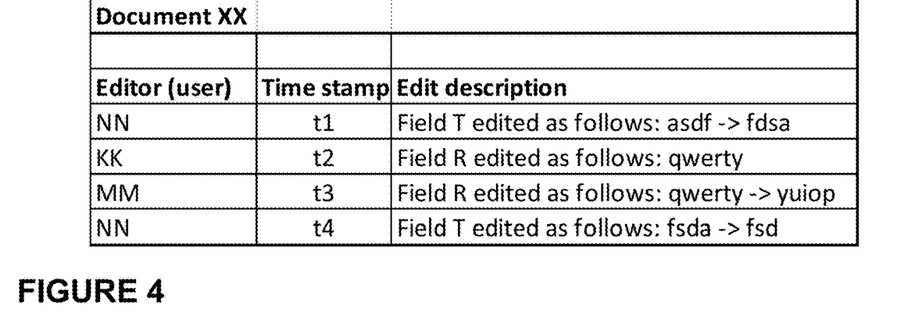
FIG. 4 schematically illustrates an example of conceptual data structure into which the edit events made into a document may be stored.

Regarding Step 310:

As described, the collaborative document editing environment comprises at least one document, which may be edited by one or more users to whom an access to edit the document is granted. The document may be downloaded into terminal devices 110A-110O for editing purposes. Prior to offering the document for downloading it may be converted from its original format to some applicable format for editor application residing in the terminal devices 110A-110C. For example, the original document format may be some commonly known word processing format, which is converted with known tools to a HTML format prior terminal devices 110A-110O can download it. To start editing a document, a user may instruct his/her terminal device 110A-110O to initiate a download of the document in the format, such as in the HTML, it is stored in the server 130 which may be configured to execute at least some operations of the processing function according to the present invention. The editor application executed in the terminal device 110A-110O receives the document and is configured to parse the document into a Document Object Model (DOM). The parsing may e.g. be performed in the terminal device with a web browser or other similar application, for example, which may be stored in the memory of the terminal device 110A-110C. While the document is stored in the Document Object Model (DOM), the document data is accessible by the user of the terminal device to whom the access is granted as described in the context of the step 310 for editing purposes. At the same time there may be one or many terminal devices connected in the collaborative document editing environment, each of which has initially retrieved the instructions to build the most recent HTML representation of the document from the server 130. Document Object Models (DOM) stored in different terminal devices 110A-110C may be kept in sync by relying on Operational Transformation (OT) technology for content consistency in concurrent editing situations while transmitting changes done by users to the processing function executed in the server 130, and then server 130 may be configured to distribute changes to other connected terminal devices 110A-110C. The transmission of changes done by a user to the DOM of the document may e.g. be triggered automatically, or manually in response to a pre-defined user action, by the editing application, such as a JavaScript application running in the browser. Hence, the editing functions carried out in various terminal devices 110A-110O may cause modifications to terminal device specific Document Object Models, and these changes get propagated for syncing purposes to the server 130 which has the ability to access the master Document Object Model, which may be considered as the most up-to-date version of the document under edit. Hence, the processing function executed in the system, such as in the server 130, may be configured to monitor 310 if the master Document Object Model, or any part of it, changes, e.g. the document is edited by at least one of the users permitted to edit the document. The granular monitoring 310 is advantageously arranged so that a monitoring procedure identifies certain editing operations, i.e. edit events, performed by one or more users propagated to the master Document Object Model accessible by server 130, now, after possible changes have been applied to it, representing the most recent version of the document data. Such monitoring 310 functionality may capture and store these changes in memory in such a format that those structures correspond to the format in which the original document is brought to. In order to enable versioning and tracking modifications done by different users, it may also store identifiers representing the edit turns or sessions, as well as authors, i.e. the users, behind those modifications. In one embodiment of the invention, the memory used for storing this information may e.g. reside in the server 130. FIG. 4 illustrates schematically an example of conceptual data structure into which the edit events made into a document may be stored. For example, the edit events may advantageously be collected in a document-specific manner, i.e. the data structure is maintained in the memory for each document being available for collaborative editing purposes. According to the exemplary embodiment of FIG. 4 the data structure comprises information on users (NN, KK, MM) some of which has made the edit event in question, time stamps (t1, t2, t3, t4) indicating information on an occasion of the edit event and a description of the edit event. For sake of clarity it is worthwhile to mention that the time stamp does not necessarily directly indicate an instant of time when a specific edit event is made. Namely, in some implementation of the present invention it may be enough to be aware on the order of edit events made to the document and the information on the order provides enough information for the further steps, as will be described. As mentioned the data structure as schematically illustrated in FIG. 4 is a non-limiting example and it may vary according to the need and/or data model in use. For example, in the context of Document Object Model the data structure is a tree-like wherein branches of the tree are called nodes. With such a tree like structure, it is possible to accurately understand the content in which a certain node is located, and acquire information of the mother/child nodes at ease. The results of the edit events to the document may advantageously be stored in the nodes for further use. As said, the data structures may vary within the area of the present invention.

The description of the edit operation made to the document is advantageously such that it provides information on the edit event at a desired level. According to the example of FIG. 4 the description of the edit provides information by means of which it is possible to derive detailed information what kind of edit event is made to the document, what is the affected location of the edit operation with the document and what is the resulting value of the affected location produced as a result of the edit operation. For example, at an instant of time t3 the user MM edited a field R in the document by replacing a text "qwerty" with a text "yuiop". In the described manner the monitoring function may collect all the edit event operations made to the document in the data structure. Additionally, the system may be configured to monitor if and when a certain user has finished editing the document in question, or when the user stops doing certain types of edit events to the document. The information on this may also be stored in the data structure of FIG. 4, or in any log file maintained for the document editing.

Regarding Step 320:

The method according to the present invention comprises a step of generating at least one notification 330 representing at least one edit event performed by the at least one of the plurality of the users permitted to edit the document. The generation of the notification may be performed by the processing function and in response to detection that the document was edited by at least one of the plurality of the users permitted to edit the document, or in response to a detection that a certain user stops editing the document, for example. The triggering of the generation of the at least one notification 320 may be arranged in a variety of ways and on basis of an applicable trigger event, or a plurality of trigger events.

For describing an important aspect of the present invention it is now assumed that a user has performed one edit event through the editing function, such as a document editor, to the document under editing and information on that is propagated to the master Document Object Model. The edit event is detected by the processing function and stored in the data structure, or similar, in the system implementing at least some portions of the present invention. According to the present invention the processing function may be configured to deliver information on the edit event to at least one user belonging to the collaborative document editing environment with respect to the document under editing, and for that purpose a notification message is configured to be generated 320. According to the embodiment of the invention the processing function may be configured to generate, i.e. prepare, the notification to be transmitted, and forward that to a communication function for transmission. In other words, the processing function may be configured to generate and transmit information to the communication function by means of which the communication function may generate and transmit a notification message to a recipient. Hence, the processing function does not necessarily form the notification message itself to be transmitted to the recipient, but indicates to the communication function the pieces of information which may be included in the notification message to be transmitted to the recipient. For example, the processing function may generate a notification to the communication function, which comprises information on the at least one edit event, and which information may also indicate one or more prompts to be included in the notification message to be transmitted to the recipient. In response to a receipt of the notification the communication function may generate the notification message, which is to be transmitted to the recipient over the communication function. The notification message may comprise one or more prompts into which the recipient may take actions to. As mentioned in some embodiment of the invention the processing function may be configured to prepare the notification message, or at least part of it, which is sent to the recipient with the communication function. The mentioned functions may refer to separate applications or separate functions within one application implemented in one or more physical entities, such as servers. The communication between the mentioned functions may be arranged over a standardized application programming interface (API), for example.

Figure 5:
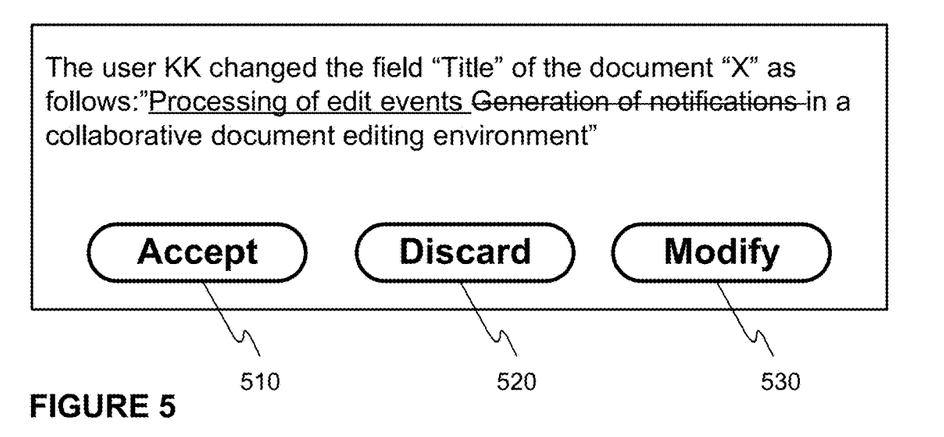
FIG. 5 schematically illustrates an example of a generated notification transmittable to the recipient according to an embodiment of the present invention.

Now, the content of the notification message is discussed in more detail. As mentioned the generation of the notification message which is to be sent to the recipient may be performed by the processing function or the communication function. As a result the notification message comprises at least one prompt by means of which the recipient may take an action directly based on the information included in the notification message by the communication function with respect to the at least one edit event carried out in the document. The at least one prompt may be considered as an action request which, when acted upon, may cause, or initiate, a predetermined action with respect to the edit event done in the document. The term action request above shall be understood at least to cover, in at least some embodiments of the present invention, both requesting the recipient to act, but also enabling the recipient to act. Moreover, the notification may comprise a description of the edit event on which the notification carries information. In FIG. 5 it is schematically illustrated a non-limiting example of a generated notification transmittable to the recipient according to an embodiment of the present invention. The notification may e.g. comprise a standardized phrase indicating the user whose edit event(s) is described in the notification and at least some information identifying the edited document and on the specific location, such as a field, in the document which is modified. Such phrase in the example of FIG. 5 is "The user KK changed the field "Title" of the document "X" as follows:", wherein the user name, the field name and the document name are variable parameters obtainable from the data structure, for example. If necessary the phrase may also indicate the document with respect to which the notification is generated. The further part of the edit description may comprise a detailed and formatted information on the edit event, which in the example of FIG. 5 is as follows: "Processing of edit events in a collaborative document editing environment".

Advantageously, the detailed information clearly indicates what is changed with the edit event. In this non-limiting example the new portion is underlined and the deleted portion is struck out and the maintained portion stands there without any additional markings. In the generated notification of FIG. 5 there are the prompts 510, 520, 530 by means of which the recipient may take actions with respect to the edits done in the document. In this case the prompts are: accept 510, discard 520 and modify 530. Hence, the user may, through an interaction with his/her terminal device, either to accept the changes made by the user KK or discard 520 the changes or modify the changes 530.

The at least one prompt in the notification may be implemented so that the recipient may take actions with respect to the edit event directly from the communication function through which the notification is transmitted. For example, the prompt "Modify" 530 may be implemented so that by selecting it the communication function opens up an application window, or a tab in a browser, through which the recipient may further modify the content of the notification disclosing the edit event carried out to the document. Alternatively, the communication function may be configured to, in response to a selection of a prompt, to initiate interactive window into which the recipient may perform necessary edit events. Still further, the selection of the prompt may cause the communication application to show sub-prompts by means of which the recipient may, through selection, indicate edit events to the at least one edit event on which the notification message carries information. The mentioned mechanisms for enabling the recipient to take action through the at least one prompt are only non-limiting examples. In preferred implementations of the invention the mechanism enables the recipient taking actions, e.g. with a third party application, in an easy manner, preferably in-context and embedded in the communication application. In another words, in preferred implementations, the further modification may be done directly in the communication application.

In some embodiment of the present invention the generated notification may carry information on a plurality of edit events which are syndicated in the notification in question in a sophisticated manner. For example, it may be arranged that the generation of the notification may form individual prompts for each edit event, which all are included in the same notification message, or there are at least one prompt which may be common to at least two edit events syndicated in the notification.

The generation step for generating the at least one notification 320 by the processing function may also be configured to perform pre-determined operations to the data structure representing the document data. These pre-determined operations typically comprise the edit events made to the document, like adding or deleting content, accepting or rejecting changes or perhaps adding content related anchored comments. The pre-determined operations may e.g. refer to filtering of information collected in the data structure, or similar. For example, the following filtering schemes may be established either alone or in combination (the list is not necessarily exhaustive):
Filtering the edit events records based on a type of edit event
Location, for example "which page", "what section" etc.
Filtering the edit event records based on an amount of edit events
Filtering the edit event records based on time information
Filtering the edit event records based on editor(s) (user(s))
Filtering the edit event records based on user profile of recipient(s)

If the filtering of edit event records inserted in the data structure is based on a type of edit event, it may be arranged so that the server 130, or the entity performing the generation of the notification, is configured to detect the type of edit event the user has made to the document and based on that to determine if information on the edit event is to be included in the notification message. In other words, the server 130 may maintain at least one criterion by means of which the determination on the filtering may be done.

Alternatively or in addition, the filtering of edit events may be based on an amount of edit events. This may refer to a number of edit events made to the document or an amount of changes with respect to total amount of information in the document, or in a certain field in it. For example, if it is above a pre-defined threshold, such as 50%, information on that shall be included in the notification, otherwise it is filtered out. This kind on implementation may be arranged so that predetermined rules, e.g. on a field and document basis, are defined in the memory of the server 130, and the amount of changes is measured and represented with an applicable parameter and compared to the stored rules, and filtering is performed accordingly.

According to still further embodiment the filtering may be arranged on a time basis. This may refer to a utilization of the time stamp information in the data structure or it may be arranged that notifications are generated, and transmitted, according to some predetermined time scheme, e.g. in every half an hour, after a certain time from the last edit event of a certain user, or immediately when the edit event is made. In a sophisticated solution the time scheme for generating and transmitting the notifications may be adjusted. According to an embodiment of the present invention the time scheme may be adjusted according to a number of users editing a certain document at the same time. The implementation based on filtering in a time based manner may be done so that predetermined rules, e.g. a number of edit events within a predetermined period of time or any similar, are defined in the memory of the server 130, and when the number of edit events exceeds the limit, notification is generated. Until that no notifications are generated.

Moreover, the time aspect may also be combined with the filtering scheme in which the amount of edit events is taken into account. With this kind of arrangement it is possible to determine an activity around a certain document or a plurality of documents for e.g. determining an order of the notifications to be sent. Namely, in some situation it is important to get notifications primarily relating to a document which is under major modifications over some other document, which is not modified that much.

Alternatively or in addition, the filtering may be based on user(s). For example, the filtering may be arranged so that information on the edit events is included to the notification only if the edit events are made by a certain user. This is advantageous especially in a situation when different users have different viewing, commenting or editing rights to the document. In such a situation the generation of the notifications may be arranged in sophisticated way by optimizing the information to be delivered to the recipients. Moreover, it may be arranged so that information on the edit events made by a certain user may be included in the notification, or transmitted, to the recipients under different notification transmit scheme than some other user(s).

Further, the filtering may also be based on user profiles stored in a memory accessible by the server 130, or any entity executing the processing function in which notifications are generated. Namely, it may be arranged that the processing function, when generating the notification(s), obtains information on at least one recipient of the notification by accessing a user profile of the at least one recipient. Based on the information stored in the user profile the processing function may perform filtering of the generated notifications on a user basis. For example, a certain user may have set that he/she is not willing to receive information on certain type of edit events. Hence, if the document is edited with such types of edit events, for the user in question no notification is generated nor sent. Moreover, according to some embodiment of the invention the users may be categorized into different groups and for each group it is given definitions on the types of edit events on which the notification shall be generated. Hence, the filtering of notifications may be performed on the group basis.

The same as described above as regards to the filtering may apply to the generation of the prompts. Namely, the system may be configured to generate prompts individually for different recipients. The generation of the prompts may be based on user rights with respect to the processing of edit events, for example. It may e.g. be arranged so that the system is configured to generate such prompts for a so called master user in the collaborative document editing environment by means of which the master user, or users, may perform master actions, such as canceling selected edits done to the document. To some other user it may generate some other kinds of prompts which may not cause such major effects with respect to the edit events. This kind of user based generation of prompts may be based on information stored in the user profiles, for example.

The above described filtering schemes and the prompt generation schemes are non-limiting examples and further schemes may be established. Moreover, the present solution may be implemented so that a plurality of the schemes are combined and in such a manner it is possible to establish sophisticated filtering schemes by means of which it is possible to optimize both the generation of the notifications and also transmitting them to recipients, but also the types of prompts provided to different recipients. This helps in optimizing the necessary computing resources and network resources as well as avoid sending too many and too frequent notifications to the users as well as optimizing rights of different users to take actions with respect to the one or more edit events though prompts.

As described the generation of the notification by the editing function may create a notification message according to the non-limiting example of FIG. 5 through which the recipient may take actions with respect to the one or more edit events disclosed in the notification. As indicated, the generated notification may be forwarded to the communication function accessible to the editing function. The editing function may also provide information on one or more recipient of the notification message to the communication function, or the communication function may maintain information on users belonging to a certain collaborative document editing environment from which it is possible to select all the users, or some sub-group of those. The communication function may e.g. be a messaging function established for, or associated with, the collaborative document editing environment.

Furthermore, in some embodiments of the invention the generation of the notifications may be triggered only when a certain phase of the editing process has ended with respect to the pre-defined editing and change approval process of the document i.e. the triggering event is based on a predetermined process flow. This kind of phase may e.g. be that a certain user who has performed the edit events closes the document in the editor, which is triggered to the system, for example. Alternatively or in addition, the generation of the notification may be triggered only when no users are editing the document in question. Also other triggering mechanisms may be implemented to, such as that the triggering is based on time-based notification into which it is defined a period of time the notification is sent, but it is also possible to define a time scheme in which recipient needs to take actions and if nothing has happened the notification, or the possibility to take action with respect the at least one edit event, expires. Some predetermined actions may also be associated to the expiry of the edit event, for example. Moreover, the triggering may also be based on role definitions in which it is defined different roles for different users, and the generation of the notification may e.g. be triggered in response to detection that certain role has taken actions with respect to the document, or the edit event in question.

For sake of clarity, the generated notification as shown in the FIG. 5 is only a non-limiting example. It may e.g. be arranged that the notification comprises other kinds of prompts, such as link to a network address external to the system by means of which a predetermined action may be caused to the document, or the edit even(s) in question. As mentioned above the communication function may be configured to generate the final outlook of the notification message according to information and indication(s) provided by the communication function. Alternatively or in addition, it may provide a link directly to the document so that when the recipient of the notification selects the link the document opens in the editing function so that the location of the edit event in question in a certain document is shown on the display of the recipient which improves and speeds up the operation from the user point of view.

Regarding Step 330:

In step 330 the at least one generated notification carrying at least one prompt by means of which the recipient may take actions with respect to the one or more edit events may be transmitted, by the communication function into which the generated notification is forwarded to, to at least one of the plurality of users permitted receive the notification. Typically, the recipient, or recipients, may be defined among the ones who are permitted to access, i.e. viewing, commenting and/or editing, the document and thus the document editing environment, and especially those who are permitted to edit the document in question. However, according to some further embodiment at least some of the recipients of the notifications may be a third party external to the at least one user granted the access the collaborative document editing environment wherein the contact address of the third party is defined in a memory of the server, for example. Moreover, the recipient may be, in some implementation of the invention, a third party external to the at least one user granted the access the collaborative document editing environment wherein the contact address of the third party may be associated with the document under edit in some known manner, or it may be included to a meta data of the document under edit. The association of the contact address of the third party may e.g. be implemented with a data record distinct to the document, into which data record the document addresses in order to capture the contact address or addresses of a third party or third parties. Hence, the transmit of the notification may be implemented so that the communication function obtains a user list, and at least the contact address of the users, from a predetermined location with respect to the document being edited, and transmits the generated notification message to the contact addresses i.e. desired recipients.

Naturally, in some implementation the transmit step may perform only the delivery of the notification to the users and the determination of the recipients, i.e. the users, and information on the recipients may be provided by the editing function to the communication function.

Regarding the steps 320 and 330 of FIG. 3 it is necessary to understand that the computer implemented solution according to the present invention may be implemented so that the editing function is configured to generate and forward the at least one notification over a standardized application programming interface (API) to the communication function. In case the standardized APIs are not used between the editing function and the communication function the editing function may be configured to generate the notification in an application-specific format, which then may be transmitted to the application in question, such as the communication application, or to a server implementing the application. In any implementation, the editing function advantageously generates the notification so that the one or more prompts in the notification may define actions, which the communication application may make available, such as display, to its user and as such enable these actions to be executed by the user of the communication application. A non-limiting example of the action may e.g. be a generation of a signal to be sent back to the original sender, i.e. such as the system implementing the communication function, in order to forward either pre-defined or user provided information back to the editing function as will be described.

Regarding Step 340:

In step 340 the system may receive in the communication function a response, from the at least one recipient, to the at least one prompt with respect to the edit event carried out to the document. In other words the recipient may take actions through the at least one prompt with respect to the edit event and the communication function is configured to detect the user actions and generate the response into which it includes at least indication on the action taken by the recipient with respect to the prompt. In case the prompt is such that recipient may add additional information to it, such as further editing to the edit event in question, information on the further editing is also included in the response.

According to an embodiment the communication function may be configured to forward, in step 340, the response, to the processing function. According to another embodiment of the invention the communication function may be configured to obtain information from the response and to generate a message with the obtained information to the processing function. The communication between the mentioned entities may again be arranged through applicable API, for example.

Regarding Step 350:

In step 350, the processing function may be configured to obtain the information received in the response, to analyze it and to generate a signal which may carry information representing the information from the response received originally from the recipient and configured to cause at least one action with respect to the at least one edit event carried out to the document. In other words, the processing function may derive the information, from the response, regarding possible actions the recipient has taken with respect to the one or more edit events on which the information was carried in the notification message. Further, the processing function may generate, based on the information derived from the response, the signal which is configured so that it causes at least one action with respect to at least the edit event on which information was carried to the recipient.

Regarding Step 360:

Now, the processing function may be configured to initiate a process which may cause the document to change according to the information included in the signal in step 350. This refers to a process in which the processing function is configured to transmit the generated signal to a function by means of which the edit of the document may be performed. The function may, according to an embodiment of the invention, be an editing function executed in an entity, such as at least one server, which may be configured retrieve the representation of the document from the entity, such as from the server 130, and perform the edits on which the signal carries information on the representation, which is then updated to the master Document Object Model (DOM). According to another embodiment of the invention the master DOM may be directly manipulated according to the information in the signal.

As already discussed the signal may e.g. comprise an indication that the recipient accepts or discards the at least one edit event on which information was transmitted in the notification, or the signal may also, or instead of, carry content to be added to the document, or with which to replace at least a part of the content of the previous edit. The mentioned pieces of information are formulated in the signal so that they may be obtained from the signal by the function receiving it and causes the function, or process, to cause the changes in the document.

Figure 6:
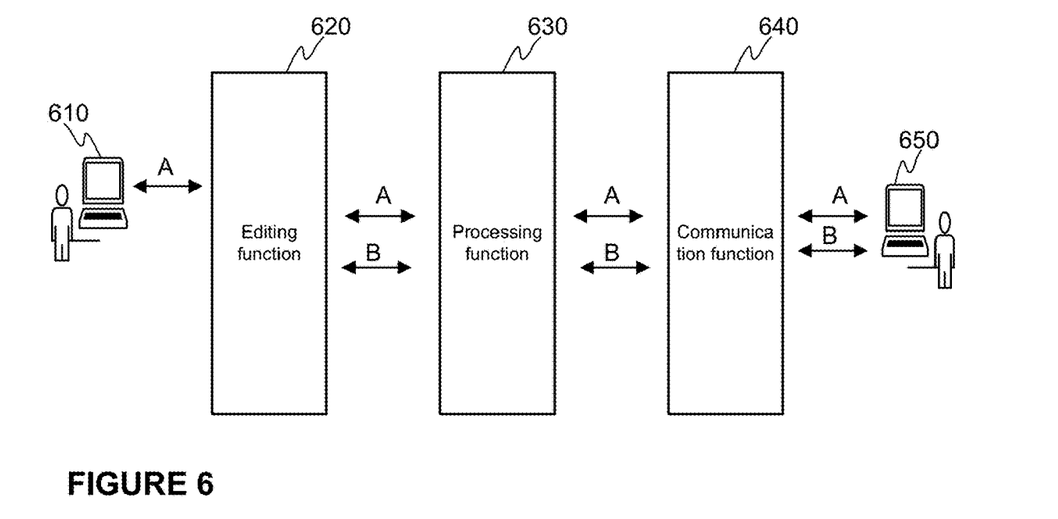
FIG. 6 schematically illustrates an interaction between at least some entities according to an embodiment of the present invention.

FIG. 6 schematically illustrates at least some aspects of the present invention from another view point. Namely, in FIG. 6 it is disclosed how the mentioned functions and entities, such as a user 610 performing the edit event and a recipient 620 receiving information on the edit event in a notification, being involved in the present invention according to one embodiment of the invention. It is hereby assumed that the user 610 opens a document for editing purposes in the terminal device, which initiates an execution of an editor in the terminal device by means of which the user 610 may perform at least one edit event in the document. Information on the edit event is transmitted to a master document, which is advantageously in an applicable document object model in the editing function 620. The processing function 620 may be configured to detect the edit events carried out in the master document through an applicable communication between the editing function 620 and the processing function 630. In response to detection, by the processing function 630, that the document is edited the processing function 630 may be configured to generate a notification on this to a communication function 640. The generation of the notification may be triggered if some predetermined trigger event is fulfilled, as described. The notification by the processing function 630 may be generated so that the communication function 640 may directly forward it to the recipient 650 or it may provide necessary instructions to the communication function 640 in order to generate the notification for the recipient 650. Finally, the notification comprising at least one prompt possibly with other information is transmitted to the recipient 650. The above described flow of information is indicated with a character A in FIG. 6. Next, the recipient 650 may take action with respect to the prompt, and the received notification in general, and a response comprising an indication on the recipient action is transmitted through the communication function 640 to the processing function 630. The processing function 630 may be configured to obtain necessary pieces of information from the response and to generate a signal into which it is included instructions how to proceed with respect to the at least edit event on which the information is transmitted to the recipient 650. In another words, the signal may carry information which may cause at least one action to be taken with respect to the at least one edit event. In the example of FIG. 6 the processing function may be configured to transmit the signal to the editing function 620, which is configured to take the at least one action according to the information carried in the signal with respect to master Document Object Model (DOM) of the document.

In the example of FIG. 6 the illustrated function are considered to be separate, but in some embodiment of the invention two or more functions may be combined as a single function. The mentioned functions may be implemented in a same physical entity, such as a server 130, or they may be distributed between two or more entities. According to some embodiment a single function may also be implemented in a plurality of physical entities, such as servers 130.

Figure 7:
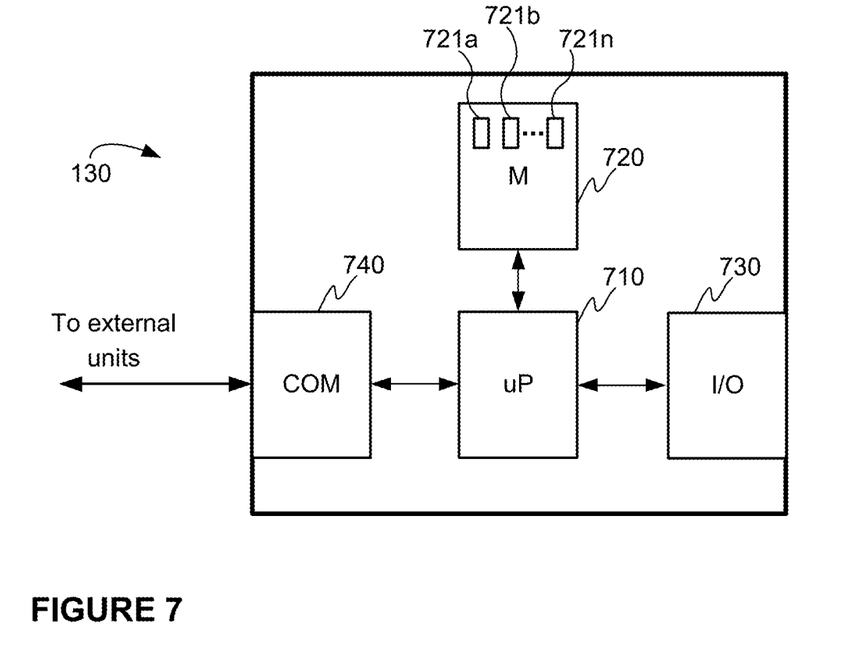
FIG. 7 schematically illustrates an example of a server which may implement at least some steps of the method according to an embodiment of the present invention.

FIG. 7 schematically illustrates an example of a server 130, as a system, which is configured to execute a set of instructions that may cause the server 130 to perform one or more of the functions, such as method steps and procedures, as described above. The server 130 may include at least one processor 710, such as a central processing unit (CPU), and a memory 720. The memory stores portions of computer program code 721a-721n, which define the set of instructions for controlling at least in part the operation of the server 130. The server 130 may further include I/O means and devices 730, such as a display unit, a keyboard, a cursor control device, a signal generation device, such as a speaker or remote control, and at least one communication interface device 740, such as a modem, in order to communication with external entities, such as with terminal devices 110A-110C and/or other servers either directly or indirectly. The mentioned entities within the server 130 may be arranged to communicate with each other through a bus.

As mentioned in some embodiments of the present invention the system may implemented in a single server 130, which is communicatively coupled to the terminal devices 110A-110C either directly or indirectly through a communication network. In some other embodiment of the present invention the system may be implemented in a decentralized manner in which a plurality of server devices are configured to perform the functions, such as the method, as described in a cooperative manner. For example, the system as decentralized servers may be configured to perform pre-determined tasks, and at least one server is configured to operate as a master device controlling and managing the whole operation. The decentralized implementation may refer to so called cloud computing solution wherein so called virtual servers may be configured to implement at least a part of the present method. The decentralized implementation may refer to, but is not limited to, so called micro architecture implementation. As mentioned in the decentralized implementation tasks and/or functions are divided between a plurality of physical servers or virtual servers, which may be configured to operate together, e.g. through agreed application programming interface(s), for generating the service they are configured to implement.

At least some aspects of the present invention may relate to a processor-readable non-transitory storage medium on which is stored one or more sets of processor executable instructions (e.g. in a form of portions of computer program code) configured to implement one or more of steps of the method as described herein. The instructions may also reside, completely or in part, within a main memory, the static memory, and/or within the processor during execution thereof by the at least one server 130. The term computer-readable medium shall also cover, but is not limited to, solid-state memories such as a memory card or other package that houses one or more read-only (non-volatile) memories, random access memories, or other re-writable (volatile) memories; magneto-optical or optical medium such as a disk or tape; as well as carrier wave signals such as a signal embodying computer instructions in a transmission medium; and/or a digital file attachment to e-mail or other information archive or set of archives considered to be a distribution medium equivalent to a tangible storage medium.

In the description herein it is mainly referred that the document is parsed to Document Object Model (DOM) for editing purposes. The Document Object Model shall be understood to be an example of the detailed structural representation of the data of a certain document, which is applicable in the context of the present invention. However, the inventive idea of the present invention is not limited to the Document Object Model only, but any model by means of which it is possible to differentiate and store parts and/or elements of the document in the memory may be applied.

The communication between the mentioned functions, and entities, may be arranged over any applicable communication techniques either wirelessly or in a wired manner. An applicable protocol for communication may e.g. be a Hypertext Transfer Protocol (HTTP), which provides tools for request and response based communication, which may be applied in the context of the present invention. Another applicable protocol to enable communication may be the Extensible Messaging and Presence Protocol (XMPP), which offers a set of open technologies and tools to build for example instance messaging, presence, collaboration and content syndication services. However, neither the HTTP or the XMPP is a non-limiting example of an applicable communication protocol.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A computer-implemented method for processing at least one edit event of a document in a collaborative document editing environment, the collaborative document editing environment incorporating an editing function implemented with a first application capable of creating and changing a content of the document, and a communication function implemented with a second application, the method comprising:
executing the editing function, by an editing user, to carry out an edit event that applies at least one edit to the content of the document at a specific location of the document, and automatically generating via the editing function at least one notification including information representative of the at least one edit applied to the content and of the specific location of the at least one edit, the generated notification also including information for generating a prompt for a recipient of the notification requesting the recipient to take an action with respect to the at least one edit of the edit event, and transmitting the at least one notification to the communication function;
receiving, from the communication function, a response to the at least one notification transmitted to the recipient, the response comprising an indication on the recipient action responsive to the prompt; and
generating a signal carrying information representing the indication on the recipient action for causing the recipient action to be carried out upon the content of the document.

2. The computer-implemented method of claim 1, wherein a detailed structural representation of data of the document is monitored to detect edit events.

3. A processor-readable non-transitory medium storing processor-executable instructions for processing at least one edit event of a document in a collaborative document editing environment according to a method as defined in claim 2.

4. The computer-implemented method of claim 1, wherein the at least one notification is generated in response to a fulfillment of a trigger event defined with respect to the at least one edit event.

5. The computer-implemented method of claim 4, wherein the trigger event is based on filtering of the at least one edit event according to a predetermined filtering scheme.

6. A processor-readable non-transitory medium storing processor-executable instructions for processing at least one edit event of a document in a collaborative document editing environment according to a method as defined in claim 5.

7. The computer-implemented method of claim 4, wherein the trigger event is based on a predetermined process flow.

8. The computer-implemented method of claim 4, wherein the trigger event is based on a predetermined time scheme.

9. A processor-readable non-transitory medium storing processor-executable instructions for processing at least one edit event of a document in a collaborative document editing environment according to a method as defined in claim 4.

10. The computer-implemented method of claim 1, wherein the prompt is implemented to embed at least one action for the editing function in the communication function.

11. The computer-implemented method of claim 10, wherein the at least one action taken with respect to the at least one edit event carried out to the document is performed by the editing function to a detailed structural representation of data of the document.

12. A processor-readable non-transitory medium storing processor-executable instructions for processing at least one edit event of a document in a collaborative document editing environment according to a method as defined in claim 1.

13. A system for processing at least one edit event of a document in a collaborative document editing environment, the collaborative document editing environment incorporating an editing function implemented with a first application, and a communication function implemented with a second application, between which communication is implemented with at least one notification, the system comprising:
at least one processor; and
at least one memory including computer program code,
the at least one memory and the computer program code configured to, upon execution by the at least one processor, cause the system to:
monitor whether a content of a document is edited by way of an edit event generated by an editing user using the editing function to apply at least one edit to the content of the document at a specific location of the document, and upon a detection that the content of the document is edited by the editing user by way of the edit event, automatically generate, via the editing function, at least one notification including information representative of the at least one edit applied to the content and of the specific location of the at least one edit, the generated notification also including information for generating a prompt for a recipient of the notification requesting the recipient to take an action with respect to the at least one edit of the edit event, and transmitting the at least one notification to the communication function,
receive, from the communication function, a response to the at least one notification transmitted to the recipient, the response comprising an indication on the recipient action responsive to the prompt, and
generate a signal carrying information representing the indication on the recipient action for causing the recipient action to be carried out upon the content of the document.

14. The system of claim 13, wherein the system is configured to monitor edit events carried out to a detailed structural representation of data of the document.

15. The system of claim 13, wherein the at least one notification is generated in response to a fulfillment of a trigger event defined with respect to the at least one edit event.

16. The system of claim 15, wherein the system is configured to base the trigger event on filtering of the at least one edit event according to a predetermined filtering scheme.

17. The system of claim 15, wherein the system is configured to base the trigger event on a predetermined process flow.

18. The system of claim 15, wherein the system is configured to base the trigger event on a predetermined time scheme.

19. The system of claim 13, wherein the system is configured to implement the prompt to embed at least one action for the editing function in the communication function.

20. The system of claim 19, wherein the system is configured to perform the at least one action taken with respect to the at least one edit event carried out to the document by the editing function to a detailed structural representation of data of the document.

* * * * *